Nov. 17, 1970 W. A. CARLSON 3,541,552

SYNCHRONIZATION SYSTEM

Filed July 26, 1968 3 Sheets-Sheet 1

INVENTOR.
WAYLAND A. CARLSON
BY [signature]
[signature]
ATTORNEYS

Nov. 17, 1970 W. A. CARLSON 3,541,552

SYNCHRONIZATION SYSTEM

Filed July 26, 1968 3 Sneets-Sheet 2

INVENTOR.
WAYLAND A. CARLSON

BY [signature] [signature]
ATTORNEYS

INVENTOR.
WAYLAND A. CARLSON
BY [signature]
[signature]
ATTORNEYS

United States Patent Office 3,541,552

Patented Nov. 17, 1970

3,541,552

SYNCHRONIZATION SYSTEM

Wayland A. Carlson, San Diego, Calif., assignor to the United States of America as represented by the Secretary of the Navy

Continuation-in-part of application Ser. No. 439,112, Mar. 11, 1965. This application July 26, 1968, Ser. No. 747,971

Int. Cl. H04b *7/00;* G04c *13/02;* H04l *7/00*

U.S. Cl. 343—225 8 Claims

ABSTRACT OF THE DISCLOSURE

A synchronization system is disclosed for synchronizing one or more remote slave clocks with a master clock to a high degree of accuracy in terms of real time. A slave clock is set to a future time at which it is desired to have the synchronization take place. By voice or other suitable communication, the selected time is made known to the master clock location and the operator at the master clock location sets this time into a master clock logic matrix when the real time set into the master clock logic matrix is reached, a first code is generated and sent to the slave station. At the same time, the master station begins counting pulses derived from the same source that drives the master clock. Upon receiving the code, the slave station responds with a second code transmitted back to the master station, thereby stopping the pulse count at the master station. Accordingly, the pulse count is a measure of the two-way propagation time between the master and the slave locations. By one of several means, the pulse count is divided by two to derive the one-way propagation time. At a fixed increment of time displacement from the initial synchronization cycle, the master station begins to count again until it achieves a cumulative pulse count which is equal to the synchronization time increment, thus effectively counting to a time which is just short of the second light time increment by the amount of time which it takes for one-way propagation from the master to the slave station. Upon reaching this count, the master station is caused to transmit a third code, which when received by the slave station, is decoded and starts the slave clock running in highly accurate synchronization that is precise to one part or less of one cyclic period of the frequency source which drives the master clock.

The invention described herein may be manufactured and used by or for the Government of the United States of America for governmental purposes without the payment of any royalties thereon or therefor.

CROSS-REFERENCE TO RELATED APPLICATION

This application is a continuation-in-part of patent application Ser. No. 439,112, filed Mar. 11, 1965, now abandoned, in the name of Wayland A. Carlson, and entitled Phase and Clock Synchronizer.

BACKGROUND OF THE INVENTION

In communications systems, identification systems, navigational systems, etc., it is frequently necessary that a master location signal source be in exact and precise synchronism with one or more remote signal sources. Although very precise signal sources are available in the present state of the art, the small errors that do exist by reason of a minute amount of instability are cumulative over a period of time and can become a source of major disruptive error where it is necessary that a master station be in precise and exact synchonism with one or more remote slave stations within some very small limit of tolerable error.

Many prior art systems employ techniques of bringing two highly accurate, but remotely located frequency sources into synchronism without regard to real time, i.e., the actual time of day in terms of hours, minutes, seconds, microseconds, etc. In still other prior art systems, it was possible to bring a portable slave station to the site of the master station in order to synchronize two highly stable frequency sources. Obviously, it is not always possible in all types of systems to bring the remote slave station to the site of the master station for purposes of synchronizing. Moreover, it is highly desirable or necessary in many cases to achieve synchronism between the master and slave stations at some selectable real time in terms of hours, minutes, seconds, etc., down to the fraction of a microsecond or less in tolerable error.

SUMMARY OF THE INVENTION

The present invention contemplates a synchronization system which is highly desirable for use in situations where one or more slave stations can communicate by voice transmission or other means to a master station naming a desired real time in terms of hours, minutes, and seconds at which the slave station desires to be precisely and exactly synchronized with the master station.

The master station includes a highly stable frequency source which drives the master clock and provides synchronous signals for other operative purposes in the system. A logic matrix or equivalent means is provided and connected with the output of the master clock so as to receive signals indicative of real time in terms of hours, minutes, seconds, etc. The real time at which the slave station has made known it wishes to be synchronized is set into the logic matrix by the operator. When the master clock reaches that time, the logic matrix produces an output which simultaneously causes two actuations. Firstly, it causes a first code to be transmitted to the slave station and at the same time it causes a counter to start counting pulses from the highly stable frequency source which is driving the master clock. When the first code is received by the slave station, it is decoded and causes a second code to be retransmitted back to the master station. The second code is decoded at the master station and causes the counter to stop counting. Accordingly, the count stored in the counter is representative of the two-way propagation time between the master and slave stations.

At the slave location, a slave clock similarly driven by a highly stable frequency source, has been set to the desired time for synchronization. Setting the slave clock to indicate the desired time for synchronization operates to stop the slave clock by disconnecting the highly stable frequency source which drives it and also sets the slave clock to at least two synchronization cycle increments after the desired time for synchronization which has been requested of the master station. The system is so designed that the synchronization cycle increments are at least greater than the maximum two-way propagation time anticipated between the slave and master stations.

The master station operates to divide the pulse count representative of the two-way propagation time by two so as to store the pulse count which is representative of the one-way propagation time between master and slave stations. This pulse count is then employed to cause the transmission of a third code for purposes of synchronization, which transmission takes place by the amount of time before the requested synchronization time which is equal to the one-way propagation time between the master and slave stations. Accordingly, the third code is transmitted from the master station to the slave station early so that it arrives at the slave station at the desired synchronization time, plus two synchronization cycle increments. Upon receipt at the slave station, the third code is decoded, causes the highly stable frequency source to be reconnected with the clock, starting it running in precise and exact synchronism with the master clock. Thus, synchronism is achieved in terms of real time, that is, hours, minutes, and seconds down to an accuracy of one or less microseconds where one megacycle stable frequency sources are employed in both the master and slave stations to drive the master clock and the slave clock.

Accordingly, it is a primary object of the present invention to provide a synchronization system for synchronization between a master station and a remote slave station which will compensate exactly and precisely for the range distance between the two stations.

It is another important object of the present invention to achieve such synchronization between a master and slave station by synchronizing a master clock and a slave clock in terms of real time, i.e., hours, minutes, seconds, milliseconds, microseconds, etc.

It is a further object of the present invention to provide such a synchronization system wherein the instantaneous range between a remote slave station and a master station is determined within the system itself to be employed for purposes of calculating precise time that the synchronization signal should be transmitted between the two to arrive at the slave station at the precise and exact moment synchronization is desired.

It is a further object of the present invention to provide such a system wherein binary counting means may be employed to facilitate the calculation of the propagation time between the master and slave stations by employing binary techniques for dividing the pulse count representative of the two-way propagation time between the master and slave stations.

These and other objects and advantages and features of the present invention will be more fully appreciated from the following description of several preferred embodiments when taken together with the accompanying drawings.

DISCUSSION OF THE PREFERRED EMBODIMENTS

Figure 1:
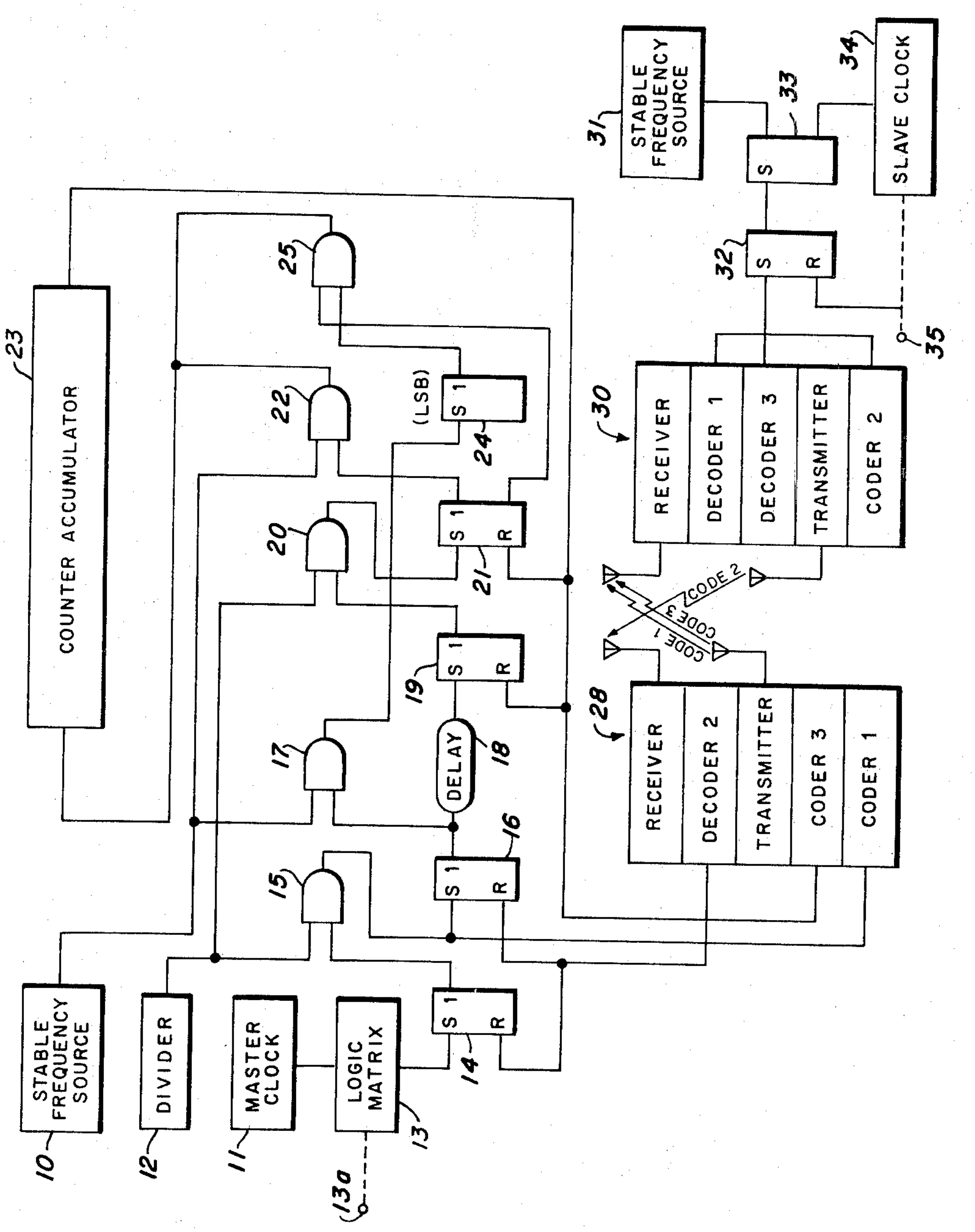
FIG. 1 is a schematic representation of a preferred embodiment of the present invention.

FIG. 1 schematically illustrates a preferred embodiment of the present invention. It includes a master station which is comprised of a stable frequency source 10 which drives both a master clock 11 and a frequency divider 12 in synchronism. Accordingly, both the master clock 11 which keeps time in real time terms of hours, minutes, seconds, mini-seconds and micro-seconds when driven by a one megacycle stable frequency source such as 10, is always in precise synchronism with the output of the frequency divider 12. In the particular embodiment illustrated in FIG. 1, a one megacycle stable frequency source producing pulses every one microsecond is contemplated and the frequency divider 12 divides the one megacycle signals which it receives from the stable frequency source 10 down to 100 cycle pulses which occur every 10,000 microseconds. The respective outputs from a stable frequency source 10 and frequency divider 12 are so indicated in the drawing to have the respective one megacycle and 100 cycle pulse outputs. Since the master clock

11 is driven directly by the stable frequency source, the real time which is reckoned by the master clock 11 in terms of hours, minutes, seconds, milliseconds, and microseconds will be correct to one microsecond or less since that is the cyclic period of the one megacycle stable frequency source 10.

The master clock provides an output which is connected to a logic matrix 13. The logic matrix 13 has an appropriate means 13*a* by which it may be set to any desired time. The logic matrix 13 has its output connected to a flip-flop 14 which in turn has its output connected as one of two inputs to an AND gate 15. The other input to the AND gate 15 is a 100 cycle pulse derived from the divider 12.

The output of the AND gate 15 provides one of two inputs into a flip-flop 16 which has its output connected as one of the two inputs to an AND gate 17. The other input to the AND gate 17 is a one megacycle pulse source, i.e., a connection from the stable frequency source 10. The output signal produced by the flip-flop 16 is also connected to a delay means 18 which, in turn, provides a delayed signal to a flip-flop 19. The output of the flip-flop 19 provides one of two inputs to an AND gate 20, the other input being a 100 cycle pulse provided by the divider 12.

The output of the AND gate 20 is connected as one of two inputs to a flip-flop 21 which produces an output connected as one of two inputs to an AND gate 22. The output of the AND gate 22 is connected as an input to a counter 23. The output of the AND gate 17 provides an input to a binary counting device 24 which operates in the manner of the "least significant bit" of the count, hereinafter referred to as (LSB), the function and operation of which will be understood from the explanation of the operation of the overall system which follows.

The output provided by the binary counting stage 24 is connected as one of two inputs to an AND gate 25 whose output in turn is connected as an input to the counter 23. The output of the AND gate 15 is connected as input to the "CODER 1" which comprises part of the transceiver equipment 28 associated with the master station, as well as providing one of the two inputs to flip-flop 16, as was previously described.

The transceiver 28 comprises a receiver, a transmitter, a DECODER 2, a CODER 1, and a CODER 3, as illustrated in FIG. 1, together with antennas associated with the receiver and transmitter, respectively.

For purposes of transmission to the slave station from the master station and reception by the master station of transmissions from slave stations, the slave station similarly comprises a transceiver 30 which includes a receiver and transmitter, a DECODER 1, a DECODER 3 and a CODER 2 as illustrated in FIG. 1. The output of DECODER 1 is connected to CODER 2. The output of DECODER 3 is connected to a flip-flop 32 which, in turn, provides the input for a flip-flop 33. A stable frequency source 31 is usually of the same frequency as the stable frequency source 10 at the master station and in the case of the embodiment illustrated in FIG. 1 is one megacycle. The one microsecond pulses which are impressed upon flip-flop 33 can therefore be employed to drive a slave clock 34. A mechanical input 35 to the slave clock 34 can be employed to set the slave clock to any real time in terms of hours, minutes and seconds. When the operator sets the slave clock 34 through means of the input 35, the mechanism also operates to reset the flip-flop 32 by an appropriate co-action.

OPERATION

In the operation of a system such as that illustrated in FIG. 1, the usual procedure is for the operator at the slave station to make a decision as to what time he would request synchronization of his slave clock with the clock at the master station. Because the two clocks, i.e., master clock and slave clock, are to be synchronized in terms of real time, i.e., actual minutes and seconds down to the nearest microsecond, the operator in the slave station must select a time in the future, i.e., he decides, for example, at 1155 hours, that he shall request synchronization. He must request synchronization for a time after 1155 hours. Accordingly, a voice communication request from the operator at the slave station to the operator at the master station may be made at 1155 hours, requesting synchronization at 1200 hours. The operator at the slave station sets the slave clock 34 by appropriate adjustment of the input 35 to read 1200 hours. The slave clock is so designed that such setting automatically sets the internal reckoning of the slave clock 34 to 1200 hours plus 2 synchronization timing increments. The synchronization timing increments referred to must be of greater duration than the maximum two-way propagation time between the master clock and the slave clock. In the system illustrated in FIG. 1, the synchronization time increments are the 100 cycle pulses derived from divider 12 which occur every 10,000 microseconds. These synchronization timing increments are illustrated by waveform (*a*) of FIG. 2, and it will be apparent that the synchronization time increments are exactly in phase and in synchronism with the stable frequency source 10, since they are derived from that source.

Upon receiving the voice communication at the master station, the operator adjusts the logic matrix 13 to read the time at which synchronization is requested, i.e., 1200 hours in the example given. This adjustment is made by the operator by means of input 13A which sets the logic matrix so that it will respond to the input of the master clock 11 when that input reaches 1200 hours. Accordingly, at 1200 hours as reckoned in the master clock 11, the logic matrix 13 responds, providing a output to the flip-flop 14 which in turn responds by generating a "1" output as one of the two inputs to the flip-flop 15. Coincident with that input is a synchronization timing increment pulse provided by divider 12 as a second input to flip-flop 15. Since these two inputs must be coincident in time because both the master clock and the divider are driven by the stable frequency source 10, the AND gate 15 is operative to produce an output. The output of the gate 15 is connected as an input to CODER 1 which is actuated and transmits CODE 1 from the master transceiver 28 to the slave location as illustrated in time relationship by waveform (*b*) of FIG. 2.

At the same time the propagation of CODE 1 is initiated to the slave station, the output of AND gate 15 is connected as an input to a flip-flop 16, setting the flip-flop 16 to produce a "1" output which provides one of the two inputs to an AND gate 17. The second input to the AND gate 17 is the output of the stable frequency source 10 operating at 1 megacycle so that a pulse is produced as an input for the AND gate 17 every microsecond. Accordingly, the two inputs to AND gate 17 cause it to produce an output which actuates element 24 and produces one of two inputs to the AND gate 25. The other input to the AND gate 25 is the "0," or reset condition of the flip-flop 21. Since the flip-flop 21 is at this stage of operation normally in reset condition, the AND gate 25 is actuated to connect 1 megacycle pulses as an input to counter 23. Counted 23 counts the continuous 1 megacycle pulses until it is shut off in a manner which will be explained hereinafter.

Figure 2:
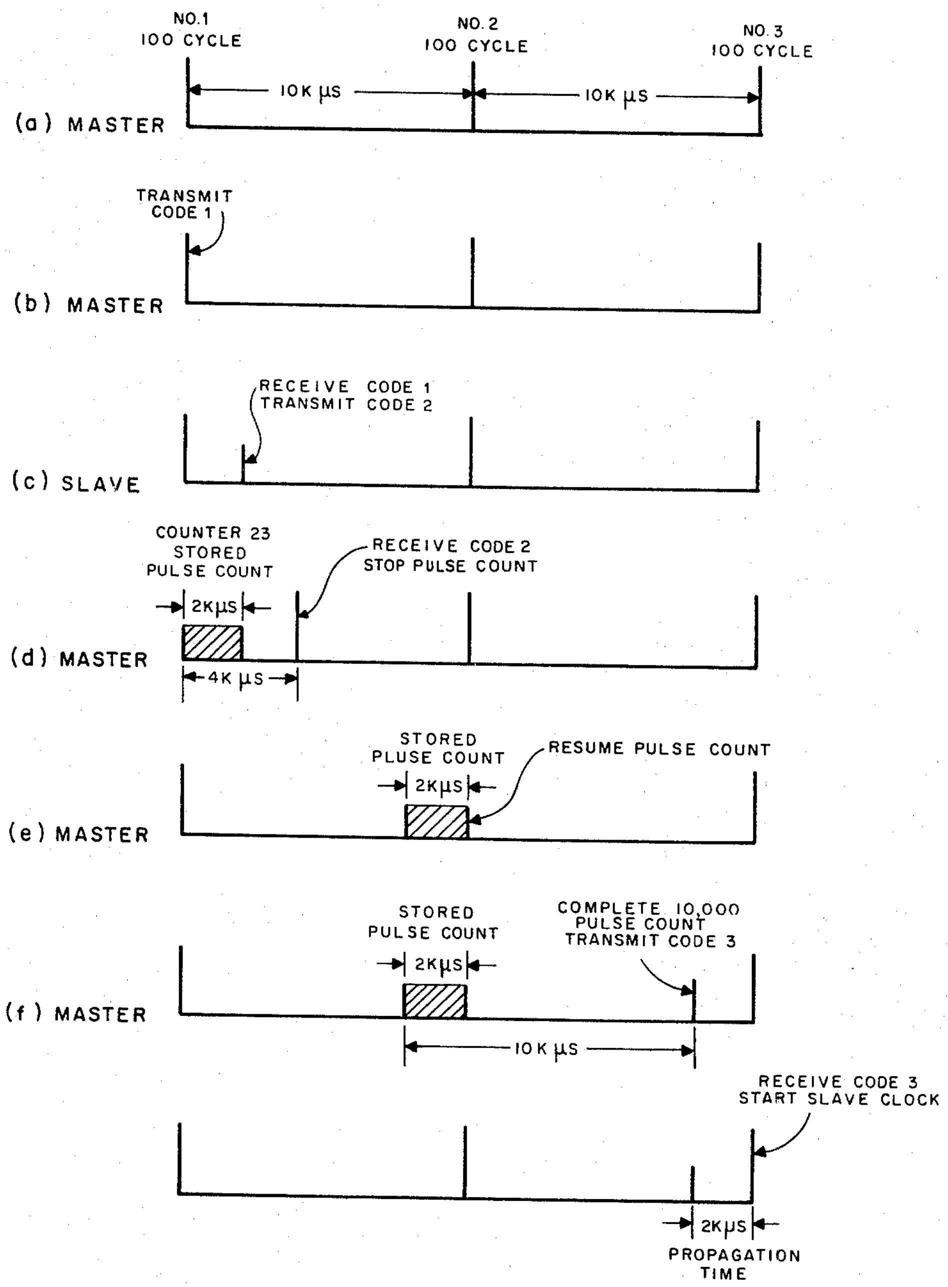
FIG. 2 is a graphic illustration of the time relationship between the plurality of signals transmitted between the master and slave stations in the order of their respective transmissions and receptions.

In the meantime, CODE 1 has been transmitted from the station transceiver 28 to the slave transceiver 30 and upon reception actuates DECODER 1 which in turn produces an output actuating CODER 2 in time relationship as shown by waveform (*c*) of FIG. 2. Thus, CODE 2 is caused to be transmitted from the slave station to the master transceiver 28 and upon reception at the master station is decoded in DECODER 2. DECODER 2 produces an output connected to the reset side of flip-flop 16 which cuts off the "1" output of flip-flop 16, therefore inhibiting gate 17 and cutting off the 1 megacycle pulses which up to that time had passed through gate 17, flip-flop 24 and 25 to be counted in the counter 23. This sequence of operations is illustrated in time relationship by waveform (*d*) of FIG. 2. Accordingly, the reception of CODE 2 at the master station effectively cuts off the counter 23. Assuming for purposes of illustration that the two-way propagation time, i.e., from the master station to the slave station and return from the slave station to the master station, consumed 4000 microseconds, the count in the flip-flop 24 and the counter 23 will be 4000 pulses as shown by waveform (*d*). It will be recalled that the flip-flop 24 operates as the least significant bit (LSB) associated with the overall count accumulated in the counter 23.

A prime object of the present invention is to provide a system which will precisely synchronize a slave station to a master station and compensate for the propagation time consumed in transmission of the synchronization signal in traveling from the master station to the slave station. Therefore, the operation which has just been described may be called a ranging cycle which is effected to determine propagation time. However, the number of pulses stored in the master station represents the two-way or round-trip propagation time. Accordingly, means must be provided for dividing the pulse count by two in order to have a pulse count which is truly representative of the one-way propagation time between the master station and the slave station.

In the equipment illustrated by FIG. 1, the means used to effect division of the pulse count by two employs the technique of dropping the least significant bit of a binarily coded number. It can be demonstrated that in a binary counter, if the least significant bit is eliminated, the number represented by the binary code is divided by two. For example, the binary code 1011100 represents 92 numerically. Upon dropping the least significant bit, the binary code becomes 0101110. The latter binary representation is equal to 46 numerically, or precisely one-half of 92. This concept is applied and implemented to perform the function of dividing the count in the master station by two in a manner which will be understood from the description of the continued operation of the system of FIG. 1.

At this point in operation, the counter 23 of the equipment illustrated in FIG. 1 has been turned off by the reception of CODE 2 transmitted from the slave station to the master station in response to the initial transmission of CODE 1 from the master station to the slave station to initiate the synchronization cycle. This condition is illustrated in terms of time displacement by waveform (*d*) of FIG. 2. It will be apparent that if the counter 23 can be made to continue to count without the least significant bit stored in the flip-flop 24, the cumulative count which occurred during the two-way transmission previously described will be effectively divided by two and yield a count which is representative of the duration of time consumed by one-way propagation. Therefore, the system of FIG. 1 is designed and adapted so as to cause counter 23 to continue a cumulative count without the least significant bit stored in flip-flop 24. The nature of the counter 23 is such that it will count to a cumulative count which is representative of the period of one full synchronization timing increment, i.e., 10,000 microseconds. Therefore, if it accepts one microsecond pulses in its counting operation, it will count to 10,000 pulses before producing an output.

In order that the synchronization code, which is CODE 3, will arrive at the slave station precisely at the desired time to effect the exact synchronization, it is necessary that it be transmitted from the master station early by an amount of time equal to the one-way propagation time. This is accomplished in the following manner. It will be recollected that the initial output of flip-flop 16 was provided as an input to a delay means 18. While the previously described operation has been going on, the delay pulse output of element 18 has been impressed as an input upon flip-flop 19 producing a "1" output as one of two inputs to the AND gate 20. As a result, during the first 4,000 microseconds which were counted, the gate 20 has but a single input, i.e., the delayed "1" output produced by the flip-flop 19. The AND gate 20, therefore, was not operative and because its second input was the 100 cycle pulse which occurs only once every 10,000 microseconds, it will not produce an output until the next 10,000 microsecond pulse which marks the completion of the first full synchronization timing increment as indicated in the waveform (*e*) of FIG. 2 and generally marked No. 2,100 cycles at the top of FIG. 2. As indicated in waveform (*e*) of FIG. 2, there has been stored, however, in the counter 23 a pulse count which is representative of 2,000 one microsecond pulses.

Upon the AND gate 20 receiving the No. 2 100 cycle pulse, it is actuated and generates an output which sets flip-flop 21, providing a "1" output as one of two inputs to an AND gate 22. The second input to the AND gate 22 is provided by continuous one microsecond pulses derived from the stable frequency source 10. Accordingly, at the instant that the AND gate 20 enabled upon occurrence of the No. 2 100 cycle pulse setting flip-flop 21 and actuating the AND gate 22, continuous one microsecond pulses are effectively connected to the input of counter 23 and it counts cumulatively. It will be recalled that the counter 23 is so designed that when it reaches a pulse count representative of one full synchronization timing increment (in this case 10,000 microseconds) the counter 23 produces its output. This output is provided as the actuating input to CODER 3 which immediately causes code 3 to be transmitted from the master station to the slave station.

As illustrated by waveform (*f*) of FIG. 2, it will be appreciated that the transmission of code 3 is early or short of the No. 3, 100 cycle synchronization point (or two full synchronization timing increments after the synchronization operation was initiated) by an amount of time equal to the one-way propagation time, i.e., 2000 microseconds. Upon code 3 being received at the slave transceiver 30, it is decoded in DECODER 3, providing an output which sets flip-flop 32, actuating the flip-flop 33 to effectively connect the stable frequency source 31 to the slave clock 34. It will be recollected that the nature of the slave clock mechanism is such that when a time is set into it, the clock is internally set to be synchronized at 1200 plus two synchronization timing increments. Because 2000 microseconds is consumed in the propagation of code 3 from the master station to the slave station, the slave clock is therefore started running at exactly 1200 hours plus two synchronization timing increments as shown by waveform (*g*) and the synchronization procedure has become complete.

In the meantime the output of counter 23 has provided a reset input to both flip-flops 19 and 21 which are normally in the reset condition at the beginning of the synchronization procedure. Accordingly, the system of FIG. 1 has now been placed in a condition to repeat the synchronization procedure with another slave station in the manner described hereinbefore.

In the waveforms illustrated in FIG. 2, it should be appreciated that the "stored pulse count" which is indicated is the count of pulses which remains in counter 23, after the initial pulse count has been concluded. Since the counter 23 will count cumulatively when the pulse input is resumed, the stored pulse count representative of 2000 microseconds in the assumed illustration, has been depicted in waveforms (*e*), (*f*), and (*h*) as a cross-hatch block of stored pulse counts representative of 2000 microseconds already in the counter 23 when the pulse count is resumed. Accordingly, the representation of the stored 2000 pulse count has been moved from a point in time where it actually occurs, i.e., immediately after the No. 1, 100 cycle timing signal as in waveform (*d*) of FIG. 2, to represent its cumulative association with the pulse count when it is resumed, i.e., the No. 2, 100 cycle synchronization timing signal.

Figure 3:
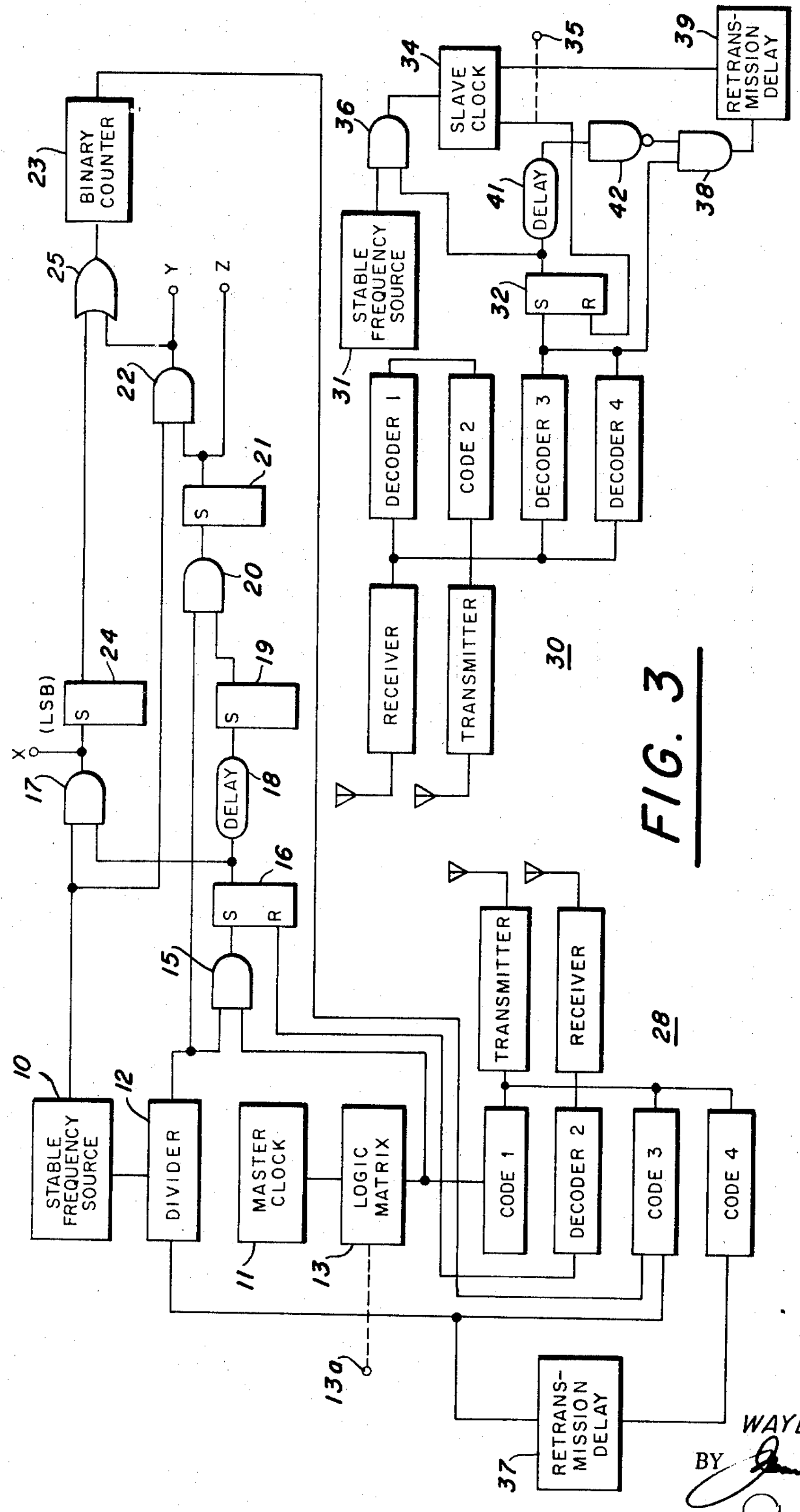
FIG. 3 is a schematic representation of the variant preferred embodiment of the present invention.

FIG. 3 is a variant embodiment of the present invention which in its initial actuation operates substantially the same as previously described in connection with the system illustrated in FIG. 1. The same numerical designations as in FIG. 1 are applied to like elements and components in FIG. 3.

The slave station operator mechanically sets the desired time of synchronization into the slave clock by means of the input 35 which resets the flip-flop 32, thereby disabling the AND gate 36 and effectively disconnecting the stable frequency source 31 from the slave clock. The slave clock remains stopped and set it the chosen time set for synchronization. As in the case of the operation depicted in FIG. 1, the mechanism of the slave clock is such that it sets the slave clock to the selected time pulse two synchronization time increments. By voice communication or other suitable means, the desired time of synchronization is conveyed to the operator at the master station where he sets the time of the logic matrix 13 through use of the input **13*a*. When the clock 11 reaches the selected time of synchronization, an output is generated by the logic matrix 13 responding to the time reckoned in the clock 11, which output is impressed as one of two outputs to the AND gate 15. The other input to the AND gate 15 is a 100 cycle pulse generated by the divider 12. Thus, the AND gate 15 produces an output which sets the flip-flop 16, impressing its output upon the AND gate 17 so that the AND gate 17 is enabled to pass one megacycle pulses continuously to the first bit of the binary counter as represented by the numerical designation 24. In this manner, the binary counter comprising the first binary bit 24 and its remainder 23**, counts continuously.

Simultaneously with the actuation of the binary counter to receive one megacycle pulses code 1 of the master station transceiver assembly 28 is generated and transmitted from the master station to the slave station. Upon receipt of code 1 by the slave station, in its transceiver 30, it is decoded in a DECODER 1 element which actuates CODE 2 element, thus causing a transmission of code 2 to be radiated from the slave station to the master station. Upon receipt of the code 2 at the master station transceiver, it is decoded producing an output which resets flip-flop 16, thus disabling the AND gate 17 and cutting off the count to the binary counter.

Prior to this actuation, however, the initial "1" output developed by the inital setting of flip-flop 16 has passed through the delay means 18 to set the flip-flop 19. The delayed set of output of flip-flop 19 therefore enables the AND gate 20 so that the next 100 cycle pulse is passed to the flip-flop 21 to enable the AND gate 22 to pass one megacycle pulses to the binary counter 23, excluding the first bit which is recorded in element 24. Accordingly, the resumption of the count is made in addition to a count which has been effectively divided by two by dropping the last significant bit retained in 24.

Upon the binary counter 23 reaching a count representative of the duration of one full synchronization timing increment, i.e., 10,000 microseconds, for instance, as illustrated in FIG. 2, it produces an output which is relayed to a CODE 3 element transmitted from the master station to the slave station and decoded in the transceiver 30 of the slave station. Upon reception and decoding of code 3 an output is produced by DECODER 3 which sets flip-flop 32 producing a "1" output, enabling AND gate 36 and effectively connecting the one megacycle stable frequency source 31 to the slave clock 34. Thus, the slave clock 34, upon the reception of code 3, is caused to be driven by one megacycle pulses continuously and in precise synchronism with the master clock to a degree of accuracy of less than one microsecond error.

It will be appreciated, of course, by those skilled and knowledgeable in the art that the degree of accuracy achieved in synchronizing the slave clock with the master clock depends upon the frequency of the two stable frequency sources employed in connection with the respective clocks. If, for instance, it is desired to have an accuracy of synchronization to within one one-hundredth of a microsecond or less, the stable frequency sources 10 and 31, respectively, should be 100 megacycle frequency.

In the event that for some reason either the transmission of code 3 by the master station or its reception by the slave station is interfered with, the apparatus will operate in the following manner. The output synchronization signal from the binary counter 23 is impressed upon a transmission delay element 37 as well as upon the code 3 element. After an appropriate and predetermined delay, such as 10,000 microseconds or 5,000 microseconds, the signal causes code 4 to be transmitted from the master station. Upon reception in the slave station, code 4 is decoded and appropriate means included within the slave transceiver assembly 30 illustrated as DECODER 4, producing an output responsive to reception of the code 4. The output causes the flip-flop 32 to be set, enabling the AND gate and effectively connecting the stable frequency source 31 to the slave clock 34. The output of code 4 is also impressed upon an AND gate 38 producing an output which adds a delay by means of an appropriate delay means 39. The amount of that delay is precisely predetermined and exactly the same as the delay interposed by element 37 at the master station. Accordingly, the starting of slave clock 34 is delayed by the same amount which was interposed in the master station and the slave clock will start in precise and accurate synchronism to within 1 microsecond in the examples used for FIG. 3.

It should be noted that when the code 3 is properly received (as well as when code 4 is received) the output of flip-flop 33 is impressed upon a delay means 40 and then connected to an inverter 42 to provide one of the two inputs to the AND gate 38. Accordingly, if no code 3 is received, there is no "1" output produced by the flip-flop 32 and the reset output of flip-flop 32 is changed to a set or "1" output in inverter 42, enabling the AND gate 38 upon reception of code 4. If code 3 is received, the set or "1" output of 32 which is produced is converted to a reset output by inverter 42 and inhibits the AND gate 38 so that no delay can be added to the synchronization of the slave clock 34.

Figure 4:
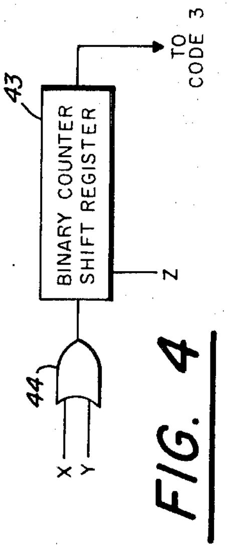
FIG. 4 is a schematic representation of yet another preferred embodiment of the present invention.

FIG. 4 illustrates a binary counter shift register 43 and OR gate 44 which may be connected into the system of FIG. 3 at the points as indicated, receiving its input from the AND gate 22 and the AND gate 17. The binary counter shift register 43 is caused to cumulatively count in the same manner as the previously described binary counters, but is so designed and adapted that at the end of the first count representative of two-way propagation time it shifts to the right one bit, effectively dividing by two. Thus, upon resumption of the remainder of the count to the full 10,000 counts, the binary counter shift register 43 has retained an initial count representative of the one-way propagation time between the master and the slave stations and continues to count to a 10,000 cumulative count to produce its output which is employed in the manner previously described.

Figure 5:
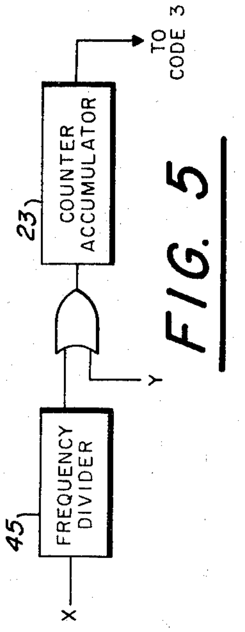
FIG. 5 is a schematic representation of the further variant of the present invention.

FIG. 5 illustrates an arrangement of a binary counter employing a frequency divider 45 which accepts the output of AND gate 17 and divides that output by two, i.e., the frequency divider 45 is responsive to every two input pulses to produce one pulse output. Accordingly, the first or initial count which is representative of the two-way or round-trip propagation time between the master and the slave station, is divided in two before it reaches counter 23. Upon resumption of the cumulative count through the AND gate 22, a one-way propagation count is stored in the counter 23 so that the proper compensation for propagation time can be made in the transmission of the synchronizing signal from the master station to the slave station.

It should be appreciated by those skilled in the art that certain relatively minor delays may be occasioned particularly in such elements which code and decode. Although these minor delays are not significant as compared to the 10,000 microsecond count which is cumulatively acquired by the counting devices as disclosed in the concept of the present invention, it may nonetheless be desirable to compensate for such delays. These delays are fixed and determinable and when they have been determined, the counters in any system embodying the present invention can be arranged to compensate for the delay time occasioned by the code and decode elements in both the master and the slave station. This is accomplished by causing the counter to produce its output a number of counts prior to the full counts, which number of counts is equivalent to the delay occasioned by the coding and decoding procedures.

Obviously many modifications and variation of the present invention are possible in the light of the above teachings. It is therefore to be understood that within the scope of the appended claims the invention may be practiced otherwise than as specifically described.

What is claimed is:

1. A system for synchronizing a remotely located slave clock with a master clock comprising:

a first stable signal source for driving said master clock, said first stable signal source having a frequency for providing continuous pulses of cyclic duration no greater than the maximum tolerable synchronization error for said system;

means responsive to said first signal source for developing lower frequency synchronization timing signals at time increments of greater duration than the maximum two-way propagation time between said master clock and said slave clock;

storage counter means responsive to start counting said continuous pulses each time it is enabled at the occurrence of a synchronization timing pulse for counting a duration of time equivalent to one synchronization timing signal increment to produce an output signal;

a second stable signal source for driving said slave clock;

means for setting said slave clock to a selectable synchronization time, said means being operative upon setting said clock to disconnect said second stable signal source and set said slave clock to receive a synchronization signal at least two synchronization timing signal increments after selectable synchronization time;

means operatively connected with said master clock and adapted to be set to said selectable synchronization time, said means being responsive, when said master clock reaches said selectable synchronization time, for enabling said storage counter means;

first code means simultaneously responsive with said storage counter means for generating a first code;

master transceiver means for transmitting said first code to said slave clock location;

slave transceiver means for receiving said first code and generating a first code output signal responsive thereto;

second code means responsive to said first code output signal for generating a second code signal;

said slave transceiver means being operative to transmit said second code to said master transceiver means;

means responsive to the reception of said second code for stopping the count of pulses in said storage counter means;

means for dividing said counted pulses by two and retaining one-half said counted pulses in storage in said storage counter means, said storage counter means being operative to resume counting upon the occurrence of the next synchronization timing signal and produce an output signal upon reaching a cumulative count equivalent to one full synchronization timing signal increment;

third code means responsive to the output signal of said storage counter means for generating a third code, said master transceiver being operative to transmit said third code to said slave clock location;

means responsive to the slave transceiver's reception of said third code for producing a synchronization signal, and said synchronization signal being operative to connect said second stable signal source to drive said slave clock starting at two or more synchronization timing signal increments after the selected synchronization time.

2. A system as claimed in claim 1 wherein said means for dividing said counted pulses by two comprises a frequency divider circuit.

3. A system as claimed in claim 1 wherein said storage counter means is a binary counter.

4. A system as claimed in claim 3 wherein said means for dividing said counted pulses comprises a binary shift register.

5. A system as claimed in claim 3 wherein said means for dividing said counted pulses comprises means for dropping the least significant bit from said binary counter.

6. A system as claimed in claim 1 wherein the generation of said third code operates to reset said storage counter means.

7. A system as claimed in claim 1 and including means for generating a fourth code at said master clock for transmission to said slave clock;

first delay means for impressing a delayed output signal of said counter upon said means for generating a fourth code before its transmission to said slave transceiver;

means for decoding said fourth code after its reception by said slave transceiver;

second delay means for impressing the same delay on the output of said means for decoding said fourth code; and means responsive to the delayed output fourth code signal for connecting said second stable frequency source to start said slave clock.

8. A system as claimed in claim 7 including means responsive to the reception of said third code at said slave clock location for inhibiting said second delay means.

References Cited

UNITED STATES PATENTS

| | | | |
|---|---|---|---|
| 2,649,580 | 8/1953 | Dunn | 340—163 |
| 3,128,465 | 4/1964 | Brilliant | 343—225 |
| 3,175,193 | 3/1965 | Willyard et al. | 343—225 X |
| 3,409,889 | 11/1968 | Raham | 343—7.5 |
| 3,491,338 | 1/1970 | Malloy | 178—69.5 |

KATHLEEN H. CLAFFY, Primary Examiner

C. W. JIRAUCH, Assistant Examiner

U.S. Cl. X.R.

58—24; 340—147, 167; 178—69.5; 343—7.5